United States Patent
Mauceri (10) Patent No.: US 7,657,422 B2
(45) Date of Patent: Feb. 2, 2010

(54) SYSTEM AND METHOD FOR TEXT ANALYSIS

(75) Inventor: Christian Mauceri, Le Plessis Robinson (FR)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/542,456

(22) PCT Filed: Jan. 23, 2004

(86) PCT No.: PCT/EP2004/001788

§ 371 (c)(1),
(2), (4) Date: Jul. 14, 2005

(87) PCT Pub. No.: WO2004/068366

PCT Pub. Date: Aug. 12, 2004

(65) Prior Publication Data

US 2006/0190244 A1 Aug. 24, 2006

(30) Foreign Application Priority Data

Jan. 30, 2003 (EP) .................................. 03368008

(51) Int. Cl.
*G06F 17/27* (2006.01)

(52) U.S. Cl. ..................... 704/9; 704/1; 704/10; 707/2; 707/3; 707/4; 707/5; 707/6; 715/257; 382/228; 382/229; 382/231

(58) Field of Classification Search .................... 704/1, 704/9, 10; 707/1–6; 382/228, 229, 231; 715/257

See application file for complete search history.

(56) References Cited

U.S. PATENT DOCUMENTS

| 5,708,829 A | * | 1/1998 | Kadashevich et al. | ........ 715/236 |
| 5,963,893 A | * | 10/1999 | Halstead et al. | ................ 704/9 |
| 6,023,760 A | * | 2/2000 | Karttunen | ................... 712/300 |

(Continued)

OTHER PUBLICATIONS

"Compiling and Using Finite-State Syntactic Rules", Kimmo Koskenniemi et al., Proc. of Coling-92, 'Online! Aug. 23, 1992-Aug. 28, 1992, pp. 156-162.

(Continued)

*Primary Examiner*—David R Hudspeth
*Assistant Examiner*—Lamont M Spooner
(74) *Attorney, Agent, or Firm*—Schmeiser, Olsen & Watts; William H. Steinberg (57) ABSTRACT

A method and system for generating a Directed Acyclic Graph (DAG) from an initial multi-chain, subject to a constraint. The initial multi-chain is expressed as a string serving as a current input string to which the constraint is subsequently applied. A provided string P expresses the constraint. P is applied to the current input string to generate at least one output string, wherein each generated output string violates the constraint to a lesser extent than does the input string or does not violate the constraint. Each generated output string violating the constraint serves as a current input string to which the constraint is subsequently applied. P is recursively applied to each current input string that had been determined from applying P previously, until applying P does not generate any more output strings violating the constraint. A set of the generated output strings not violating the constraint represents the DAG.

21 Claims, 2 Drawing Sheets

U.S. PATENT DOCUMENTS

| | | | | |
|---|---|---|---|---|
| 6,032,111 | A * | 2/2000 | Mohri | 704/9 |
| 6,333,999 | B1 * | 12/2001 | Brownsmith | 382/229 |
| 6,553,531 | B1 * | 4/2003 | Kim et al. | 714/739 |
| 6,684,201 | B1 * | 1/2004 | Brill | 706/45 |
| 6,944,588 | B2 * | 9/2005 | Kempe | 704/9 |
| 6,947,918 | B2 * | 9/2005 | Brill | 706/45 |
| 6,990,519 | B2 * | 1/2006 | Fortenberry et al. | 709/223 |
| 7,010,476 | B2 * | 3/2006 | Karttunen et al. | 704/1 |
| 7,107,205 | B2 * | 9/2006 | Kempe | 704/2 |
| 7,257,565 | B2 * | 8/2007 | Brill | 706/45 |
| 7,383,173 | B2 * | 6/2008 | Mueller | 704/9 |
| 2002/0165701 | A1 * | 11/2002 | Lichtenberg et al. | 703/7 |

OTHER PUBLICATIONS

"The Replace Operator", Lauri Karttunen, Finite State Language Processing, 1997, pp. 117-147.

Atro Voutilainen et al., "Ambiguity Resolution in a Reductionist Parser", Sixth Conference of the European Chapter of the Association for Computational Linguistics, 'Online!! 1993, pp. 394-403.

\* cited by examiner

SYSTEM AND METHOD FOR TEXT ANALYSIS

TECHNICAL FIELD

The present invention relates to Natural Language Processing in general and in particular to a system and method for text analysis.

BACKGROUND OF THE INVENTION

The key insights of Natural Language Processing (NLP) studies through the use of computational techniques has allowed to apply such field to the resolution of nowadays real-world problems, such as information retrieval or Web-based services, to name a few.

However, the complexity of the human language has led to make separate linguistic analysis to offer performant NLP systems, and one of these is the morphosyntactic analysis of sentences, which is also known as the tagging. In fact, due to the high ambiguity of the human language where one word may have different grammatical values (such as being a verb or a noun), it is of utmost importance to correctly resolve ambiguities in order to avoid misinterpretations. To solve those issues, several approaches have emerged and particularly:

- statistical Part Of Speech (POS) Taggers which generally use the so-called Hidden Markov Model (HMM) and the Viterbi algorithm;
- formal rule systems;
- or a mix of the two.

The POS systems available on the market work quite well and offering a very high rate of success, for instance above 80% for Written Standard English.

However statistical POS are very dependent on the corpus they use to learn the trigram or bigram frequencies they use, besides they need a human operator tagging by hand a very large corpus to produce sufficient learning set.

Among the POS taggers, the ones using Constraint Grammars are of a particular interest because of their speed, their robustness and their accuracy. Most of the Constraint Grammars based systems intersect a Directed Acyclic Graph (DAG) that represents a text having ambiguity with a Directed Graph (a Finite State Transducer) that represents a set of constraints. However, a major drawback of such implementation is that the graph representation is very complex to deal with, requiring complex algorithms difficult to program and often machine dependent in their implementation. These problems limit the use of such systems to the specific language they are developed for.

Thus, what is needed is a system and method for overcoming the deficiencies of the conventional technology as discussed above.

SUMMARY OF THE INVENTION

It is therefore an object of the invention to provide a computer implemented system and method that allows simpler, faster and more portable text analysis.

This object is achieved by the present invention wherein the Direct Acyclic Graphs are represented by 'DAG' strings to be processed with a simple finite state automata.

In a preferred embodiment, the method of the invention is operable in a computer system having means for building a Directed Acyclic Graph (DAG) representing at least one constraint applied on an initial string multi-chain. The method preferably comprises the steps of:

(a) building at least one regular expression from the at least one constraint;
(b) seeking in the initial string multi-chain where the at least one constraint applies using the at least one regular expression;
(c) splitting the initial string multi-chain in sub multi-chains with respect to where the at least one constraint applies; and
(d) applying steps (b) and (c) to each sub multi-chain until the at least one constraint does not apply.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
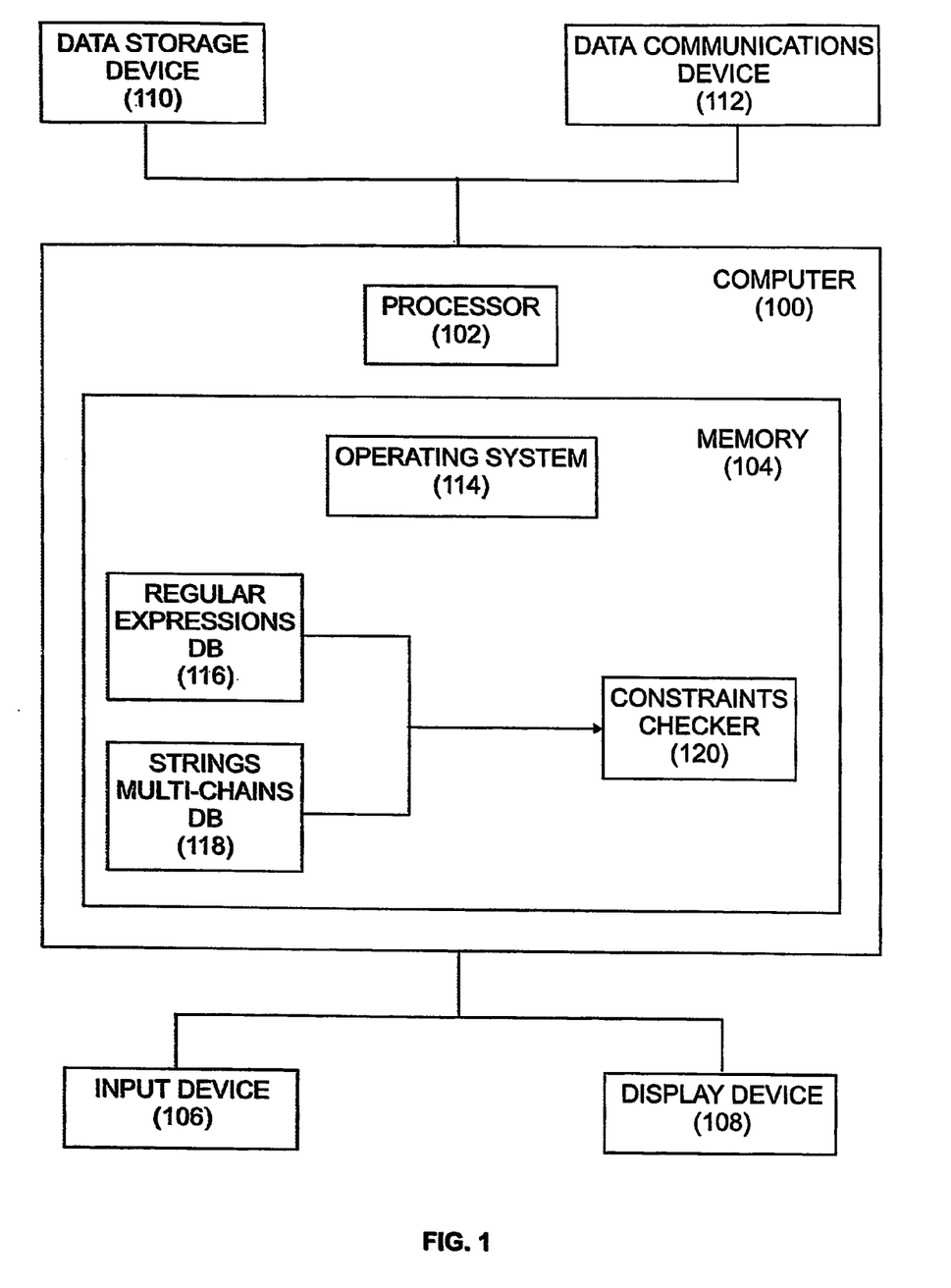
FIG. 1 is a block diagram illustrating an exemplary hardware environment that may be used to implement the preferred embodiment of the invention.

FIG. 1 is a block diagram illustrating an exemplary hardware environment that may be used to implement the preferred embodiment of the present invention. In the exemplary hardware environment, a computer 100 may include, inter alia, a processor 102, memory 104 (e.g., random access memory (RAM)), input devices 106 (e.g., keyboard, mouse pointing device, voice activated input device, etc.), display devices 108 (e.g., CRT, LCD displays, etc.), as well as a data storage devices 110 (e.g., hard, floppy, and/or CD-ROM disk drives, etc.), and/or data communication devices 112 (e.g. modems, network interfaces, etc.). It is envisioned that attached to the computer 100 may be other devices, such as a read only memory (ROM), a video card, bus interface, printers, etc. Those skilled in the art will recognize that any combination of the above components, or any number of different components, peripherals, and other devices known in the art, may be used with the computer 100. The computer 100 operates under the control of an operating system (OS) 114, such as OS/390™, MVS™, VM™, OS/2™, AIX™, UNIX™, WINDOWS™, MACINTOSH™, etc. The operating system 114 is booted into the memory 104 of the computer 100 for execution when the computer 100 is powered-on or reset. In turn, the operating system 114 then controls the execution of one or more computer programs, such as a constraint checker 120. The constraint checker allows to build the novel DAG representation of the present invention both from regular expressions and strings multi-chains. The string multi-chains are generally obtained from initial multi-chains which are a common DAG representation of a phrase to be disambiguated and stored in a string multi-chains database 118. The phrase may be a text stored in a text file on the data storage device 110 and/or entered interactively by a programmer from an input device 106.

The regular expressions are stored in regular expressions database 116. A regular expression (generally abbreviated as regexp or regex) is a sequence of entities that describes a whole set of strings, according to certain syntax rules (also called the constraints). These expressions are used by many text editors and utilities to search bodies of text for certain patterns and, for example, replace the found strings with a certain other string. There are a few basic type of matching that will need to acquaint with: character matching, repetition matching, and position matching. Regular expressions are thus essentially a tiny, highly specialized programming language that allow to specify the rules for the set of possible strings that are to be matched. Regular expressions are used frequently in Unix operating system and Unix-like ones (Unix is a trademark of Unix System Laboratories). To learn more about regular expressions, the reader may refer to the book of A. Aho, R. Sethi and J. Ullman titled "Compilers, Principles, Techniques and Tools" ADDISON WESLEY.

The regular expressions database 116, string multi-chains database 118 and constraint checker 120 are comprised of logic and/or data which, when accessed, interpreted, and/or executed by the processor 102, cause the computer 100 to perform the steps necessary to implement and/or use the present invention. Generally, the regular expressions database 116, string multi-chains database 118 and constraint checker 120 are embodied in and/or readable from a device, carrier or media, such as memory 104, data storage device 110, and/or a remote device coupled to the computer 100 via the data communications device 112. Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data embodied in and/ or readable from any device, carrier, or media. Of course, those skilled in the art will recognize many modifications may be made to this configuration without departing from the scope of the present invention. Those skilled in the art will recognize that the exemplary environment illustrated in FIG. 1 is not intended to limit the present invention. Indeed, those skilled in the art will recognize that other alternative hardware environments and programs may be used without departing from the scope of the present invention.

Figure 2:
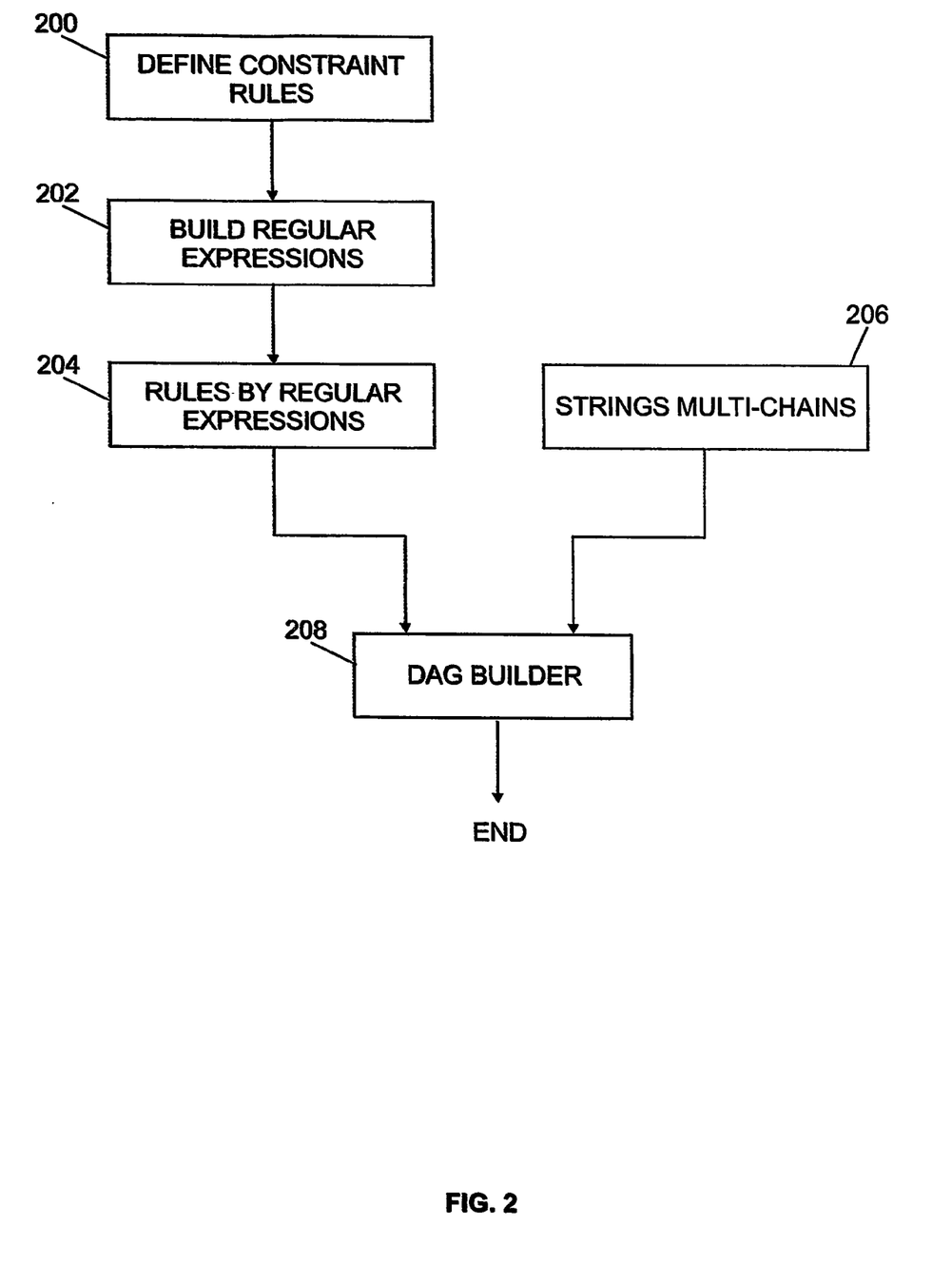
FIG. 2 is a flow chart that illustrates the steps performed by the method of the present invention.

Before referring to FIG. 2, a background overview on Graph, Directed Graph and Directed Acyclic Graph is first made. A finite state machine (FSM) or finite state automaton (FSA) is an abstract machine used in the study of computation and languages that has only a finite, constant amount of memory (the state). It can be conceptualized as a directed graph. There are a finite number of states, and each state has transitions to zero or more states. There is an input string that determines which transition is followed. A graph describes a set of connections between objects. Each object is called a node. It can also be called a vertex. The connections themselves are called edges or arcs. A root node is the top node in a tree data structure. All data in a tree can be accessed through the root node. In some trees, the root node has special properties (like being allowed a greater or smaller than normal number of child nodes). A leaf node is a node of a tree that has zero children. Often leaf nodes are the nodes farthest from the root node. Some trees only store data in leaf nodes. A parent node or ancestor node is a node in a tree data structure that links to one or more child nodes. A child node or descendant node is a node in a tree data structure that is linked to by a parent node.

A Directed Acyclic Graph (DAG) representing a phrase to be disambiguated is of certain form called a multi-chain as previously mentioned. And a multi-chain is a directed acyclic graph having the following properties:

A multi-chain has only one root and only one leaf.
Each arc or edge coming from a given node reaches the same node.

Below is a graphical description of a multi-chain (MC) where node 1 is the root and node 6 is the leaf From the above exemplary, let's explain how a constraint, i.e. given rule, applies on such a multi-chain. Let's state, as a constraint, that the sequence "ac" is to be excluded from the above multi-chain. The skilled man would easily represent this constraint by the following graph (CT):

In this graph representation, the symbol @ means "any character except those labeling an edge coming from the same node". Node 1 is a root (a start node) and node 2 is an end node. In addition node 3 represents a sink, i.e. a node having no issue.

The intersection of the two previous graphs MC with CT leads to the resulting Directed Acyclic Graph (DAG):

In this DAG, as an expected result, there is no path containing the sequence "ac". It can be decomposed into a set of five multi-chains (MC1 to MC5):

The skilled person will appreciate that each chain of the above resulting DAG (DAG) is found in one or more of the above former multi-chains (MC1 to MC5).

The inventor has used a particular representation of the multi-chains in order to offer the present computer implemented simple method. Multi-chains are then represented in the form of "string" expressions which are more easily operable on computers. For instance, the first illustrated multi-chain (MC) may be expressed as the following string (ST):

ST=<a b c><a b><a b c><a c><a c>, wherein

<a b c> means that two nodes are linked by the edges a, b and c. Then with this formalism, the string (ST) above means that node (or position) 2 is reached from node (or position) 1 by either edges a, b or c. Then position 3 is reached by edges a or b. Position 4 is reached by edges a, b or c. Position 5 is reached by edges a or c and at last position 6 is reached by edges a or c.

In the same way the other multi-chains (MC1 to MC5) obtained by applying the constraint stating to avoid the sequence "ac" may be expressed respectively by the following strings (ST1 to ST5):

ST1=<a b c><a b><b><c><a c>
ST2=<a b c><a b><a b><a><a>
ST3=<a b c><b><a b c><a><a>
ST4=<a b c><b><b c><a c><a>
ST5=<a b c><b><b c><c><a c>

Referring now to FIG. 2, the inventor has devised a method to derive directly string multi-chains (ST1 to ST5) when applying a defined constraint (200) to an initial multi-chain (MC) represented as a string (ST) multi-chain (206). In a first operation (202), a regular expression is built allowing to detect the desired constraint (200) in a multi-chain. From the above example, where to detect the sequence "ac", a corresponding regular expression may be built as follow:

$$P=``<"`(@*``>"@*)``a"`(@*``>"@*)``>"``<"`(@*``>"@*)``c"`(@*``>"@*)``>"$$

wherein, the symbol @ means any character;
'pattern'* is the well-known star operator which means 0 or several occurrences of the regular expression 'pattern', so @*0 or several occurrences any character;
^('pattern') means anything which doesn't match the regular expression 'pattern', in this way ^(@*">"@*) means any string which doesn't contain the character >;
the concatenation of two expressions is implicit thus "<"^(@*">"@*)"a"^(@*">"@*)">" means: character <, followed by anything which doesn't contain the character >, followed by the character a, followed by anything which doesn't contain the character >, followed by character >.

Like this, regular expression P means something containing a between two delimiters < and > followed by something containing c between two delimiters < and >. Pattern P match, from position 1, the substring <a b><a b c> in initial string ST, and this substring violates the constraint because "ac" is a possible chain in the multi-chain <a b><a b c>. The other chains (other than ac) in this multi-chain are contained in the two multi-chains:

<b><a b c>
<a b><a b>

On a next step, the constraint as expressed by the regular expression (block 204) is applied to the initial string ST (206), in a first run of the DAG builder algorithm of the present invention (block 208). This provides new strings, i.e. sub multi-chains, two in the discussed example, STA1 and STA2:

STA1=<a b c><b><a b c><a c><a c>
STA2=<a b c><a b><a b><a c><a c>

Pattern P match, from position 3, the substring <a b c><a c> in STA1. A second run of the DAG builder algorithm is operated on STA1 and new strings STA11 and STA12 are obtained:

STA11=<a b c><b><b c><a c><a c>
STA12=<a b c><b><a b c><a><a c>

Similarly, in string multi-chain STA2, pattern P match at position 3, and by operating the DAG builder new strings STA21 and STA22 are obtained:

STA21=<a b c><a b><b><a c><a c>
STA22=<a b c><a b><a b><a><a c>

The DAG builder is run on STA11 where the pattern matches at position 4, and new strings STA111 and STA112 are obtained:

STA111=<a b c><b><b c><c><a c>
STA112=<a b c><b><b c><a c><a>

Similarly, in string multi-chain STA12, pattern P match at position 4, and by operating the DAG builder new strings STA121 and STA122 are obtained:

STA121=<a b c><b><a b c><a><a>
STA122=<a b c><b><a b c><><a c>

It is to be noted that STA122 is not a valid string (because of empty brackets).

The DAG builder is run on STA21 where the pattern matches at position 4, and new strings STA211 and STA212 are obtained:

STA211=<a b c><a b><b><c><a c>
STA212=<a b c><a b><b><a><a>

Finally, the DAG builder is runned on STA22 where the pattern matches at position 4, and new strings STA221 and STA222 are obtained:

STA221=<a b c><a b><a b><><a c> which is not valid
STA222=<a b c><a b><a b><a><a>And it is to be noted that STA221 is not a valid string (because of empty brackets).

The several previous operatings of the DAG builder have lead to final strings on which the pattern P doesn't match anymore. Some may be ignored as being invalid ones (STA122 and STA221) or as being duplicated (STA212 as being included in STA222). So the final valid strings obtained by the DAG builder are listed below:

STA111=<a b c><b><b c><c><a c>
STA112=<a b c><b><b c><a c><a>
STA121=<a b c><b><a b c><a><a>
STA211=<a b c><a b><b><c><a c>
STA222=<a b c><a b><a b><a><a>

And it is to be appreciated that these strings multi-chains correspond respectively to the string multi-chains (ST1 to ST5) representing the initial multi-chain (MC) when applying the defined constraint.

The preceding method that generated the output strings STA111, STA112, STA121, STA211, and STA222 is summarized as follows. Starting with the initial multi-chain (MC) subject to a defined constraint, the initial multi-chain is expressed as a character string ST that serves as a current input string to which the constraint is subsequently applied to generate STA1 and STA2. A regular expression P is built, wherein P is in a character string format and expresses the defined constraint. The regular expression P is applied to the current input string (initially ST) to generate output strings (i.e., output strings STA1 and STA2 when the current input string is ST), wherein each generated output string violates the defined constraint to a lesser extent than does the input string or does not violate the defined constraint. In the preceding example, both STA1 and STA2 violate the defined constraint. Each generated output string violating the defined constraint will serve as a current input string to which the defined constraint is subsequently applied in the same manner as was initially applied to ST. The regular expression P is recursively applied to each current input string that had been determined from applying P previously, until applying P does not generate any more output strings violating the defined constraint, resulting in the recursively generated strings STA11, STA12, STA21, STA22, STA111, STA112, STA121, STA122, STA211, STA212, STA221, and STA222. A set of the generated output strings not violating the constraint (i.e., STA111, STA112, STA121, STA211, and STA222) represents the DAG.

A more generalised description of the invention is now made. It is well-known by skilled persons that constraint grammars use two main kind of rules:

Negative rules stating that a given expression cannot appear in a given context. In the formalism generally used such rules are expressed in the following way:

C<=L_R which means that regular expression C cannot appear between regular expression L and regular expression R.

Positive rules stating that a given expression is mandatory in a given context. In the formalism generally used such rules are expressed in the following way:

C=>L_R which means that regular expression C is mandatory between regular expression L and regular expression R.

The regular expressions L, C and R are made on regular expressions describing basic connections between nodes, for instance:

<b>="<"(@*(">"|"b")@*)("<b"|"b")^(@*(">"|"<b"|"b")@*)">"

means that a connection between two nodes containing an edge labeled by b match, for instance, the connections:

<b c>, <a b c> or <b>

But not:

<a c> or <a>

Alternatively, the regular expression builder may be design to produce three kinds of strings:

For the first resulting string it'll rewrite only explicit expressions such as "<", ">", "<b" or "b" and erase everything matched by the meta character @ in this way the evaluator behaves like the substitute command of the well known sed program in UNIX or the well known PERL program, it erases all characters except b and the delimiters < and >, it could be written in this formalism for this example s/<[^<b]*b[^<b]*>/<b>/.

For the second resulting string it'll rewrite only delimiters "<" and ">" and all characters except b. In the PERL language this can be written as: s/<([^<b]*)b([^<b]*)>/<$1$2>/.

The last resulting string is the matched string itself.

Preferably, for each edge x which can be encountered in the multi-chains that are to be analyzed, corresponds a basic regular expression <x>. In this way, the example given in the paragraph above gives the basic regular expressions <a>, <b> and <c>. The rule preventing the sequence ac in this same example is then written:

<a><=_<c>

From this rule the following regular expression may be built:

0:"<L>"<a>0:"<C>"<c>0:"<R>"

where <L>, <C> and <R> are tags allowing to split the matched multi-chain in its left, center, and right parts (0:"xyz" means to generate the string "xyz"). This expression applied to the string:

MC=<a b c><a b><a b c><a c><a c>

By runnning the builder gives from first position the three strings:

MC1-1=<L><a><C><><R>
MC1-2=<L><b c><C><a b><R> and
MC1-3=<L><a b c><C><a b><R>

As the connection between <C> and <R> is empty, the rule fails from this position.

From the second position the expression MC leads to:

MC2-1=<L><a><C><c><R
MC2-2=<L><b><C><a b><R> and
MC2-3=<L><a b><C><a b c><R>

From these three strings, the two multi-chains that are required to prevent the occurrence of the chain <a><c> in the multi-chain <a b><a b c> may be built:

<b><a b c> because everything following something else than <a> is not impacted by the rule; and <a><a b> because everything following <a> must not contain c.

The overall algorithm is thus as follows: first a corresponding regular expression is build (202) for each rule of the constraint grammar (200):

for each rule R=C<=L_R or R=C=>L_R build regular expression P=L 0:"<L>" C 0:<"C>" R 0:"<R>"

Then for a multi-chain MC to analyze (206), let set that "Branches" are an empty list of multi-chain, "Position" an empty double entry list giving for each rule number and each branch of analysis number the position where to apply the rule in the branch and "Rules" the list of regular expressions built formerly from the set of rules coming with an indicator of the nature of the rule (positive or negative).

The present method preferably implements a function "applyRule" (204) which performs the operations described above taking as argument a rule from the Rules list, a branch of analysis from Branches and the position from Position where to apply the rule on the branch.

Then the DAG builder function (208) is run on the Multi-chain to analyze, as detailed previously, as long as the rule matches. The process stops when the final strings are obtained, i.e. the last remaining branches.

While the algorithm has been described in its basic mode, many modifications and improvements may be made in many ways, such as for instance efficiently looking for the first position a rule can be applied on a branch, or by taking advantage of the left context of the rules grouping them by the same left context. Moreover, as another alternative, the management of the positions and branches can be improved taking into account the branches marked as inoperative.

The advantage of this approach belongs to its simplicity and its portability as only strings of characters are required to implement it. The principle of the invention rests on the use of simple pattern matching techniques on strings commonly described in the literature, the main idea being that the DAGs may be described by a set of strings representing multi-chains.

Finally, it is to be appreciated by those skilled in the art that while the invention has been particularly shown and described with reference to a preferred embodiment thereof, various changes in form and details may be made without departing from the spirit and scope of the invention.

The invention claimed is:

1. A computer implemented method for generating a Directed Acyclic Graph (DAG) from an initial multi-chain subject to a constraint, the method comprising:
   expressing the initial multi-chain as a character string that serves as a current input string, wherein the input string expressing the initial multi-chain violates the constraint, and wherein the constraint with respect to a given input string expresses a condition that the given string either satisfies or violates;
   providing at least one regular expression that expresses the constraint, said at least one regular expression being in a character string format and being denoted as P;
   applying P to the current input string to generate at least one output string, wherein each generated output string violates the constraint to a lesser extent than does the input string or does not violate the constraint, and wherein each generated output string violating the constraint will serve as a current input string to which the constraint is subsequently applied;
   if the at least one output string violates the constraint as a result of said applying P then responsive to the at least one output string violating the constraint, recursively repeating said applying P to each current input string that had been determined from applying P previously, until said applying P does not generate any more output strings violating the constraint, wherein a set of the generated output strings that do not violate the constraint represents the DAG; and
   displaying, on a display device, the set of the generated output strings that do not violate the constraint,
   wherein said recursively repeating said applying P is performed at least once.

2. The method of claim 1, wherein said applying P comprises:
   identifying a substring of the input string violating the at least one constraint and not being the input string;
   deriving from the substring all strings not violating the at least one constraint; and
   for each derived string, replacing the substring in the input string with each derived string to generate each output string.

3. The method of claim 2, wherein said deriving comprises deleting at least one character from the substring to generate each derived string.

4. The method of claim 1, wherein the at least one output string resulting from applying P to the character string that expresses the initial multi-chain violates the at least one constraint.

5. The method of claim 1, wherein the at least one output string resulting from applying P to the character string that expresses the initial multi-chain does not violate the at least one constraint.

6. The method of claim 1, wherein a first output string of the at least one output string generated from applying P to the input string expressing the initial multi-chain violates the at least one constraint to a lesser extent than does the input string expressing the initial multi-chain.

7. The method of claim 6, wherein the at least one output string generated from applying P to the input string expressing the initial multi-chain comprises a plurality of output strings, and wherein a second output string of the at least one output string generated from applying P to the input string expressing the initial multi-chain violates the at least one constraint to a lesser extent than does the input string expressing the initial multi-chain.

8. A computer program product stored on a computer readable storage medium comprising a computer program product stored thereon, said computer program product comprising computer readable program code adapted to perform a method for generating a Directed Acyclic Graph (DAG) from an initial multi-chain subject to at least one constraint, the method comprising:
   expressing the initial multi-chain as a character string that serves as a current input string, wherein the input string expressing the initial multi-chain violates the constraint, and wherein the constraint with respect to a given input string expresses a condition that the given string either satisfies or violates;
   providing at least one regular expression that expresses the constraint, said at least one regular expression being in a character string format and being denoted as P;
   applying P to the current input string to generate at least one output string, wherein each generated output string violates the constraint to a lesser extent than does the input string or does not violate the constraint, and wherein each generated output string violating the constraint will serve as a current input string to which the constraint is subsequently applied;
   if the at least one output string violates the constraint as a result of said applying P then responsive to the at least one output string violating the constraint, recursively repeating said applying P to each current input string that had been determined from applying P previously, until said applying P does not generate any more output strings violating the constraint, wherein a set of the generated output strings that do not violate the constraint represents the DAG; and
   displaying, on a display device, the set of the generated output strings that do not violate the constraint,
   wherein said recursively repeating said applying P is performed at least once.

9. The computer program product of claim 8, wherein said applying P comprises:
   identifying a substring of the input string violating the at least one constraint and not being the input string;
   deriving from the substring all strings not violating the at least one constraint; and
   for each derived string, replacing the substring in the input string with each derived string to generate each output string.

10. The computer program product of claim 9, wherein said deriving comprises deleting at least one character from the substring to generate each derived string.

11. The computer program product of claim 8, wherein the at least one output string resulting from applying P to the character string that expresses the initial multi-chain violates the at least one constraint.

12. The computer program product of claim 8, wherein the at least one output string resulting from applying P to the character string that expresses the initial multi-chain does not violate the at least one constraint.

13. The computer program product of claim 8, wherein a first output string of the at least one output string generated from applying P to the input string expressing the initial multi-chain violates the at least one constraint to a lesser extent than does the input string expressing the initial multi-chain.

14. The computer program product of claim 13, wherein the at least one output string generated from applying P to the input string expressing the initial multi-chain comprises a plurality of output strings, and wherein a second output string of the at least one output string generated from applying P to the input string expressing the initial multi-chain violates the at least one constraint to a lesser extent than does the input string expressing the initial multi-chain.

15. A computer system comprising a processor and a computer usable memory, said memory storing computer readable program code which when executed by the processor performs a method for generating a Directed Acyclic Graph (DAG) from an initial multi-chain subject to at least one constraint, the method comprising:

expressing the initial multi-chain as a character string that serves as a current input string, wherein the input string expressing the initial multi-chain violates the constraint, and wherein the constraint with respect to a given input string expresses a condition that the given string either satisfies or violates;

providing at least one regular expression that expresses the constraint, said at least one regular expression being in a character string format and being denoted as P;

applying P to the current input string to generate at least one output string, wherein each generated output string violates the constraint to a lesser extent than does the input string or does not violate the constraint, and wherein each generated output string violating the constraint will serve as a current input string to which the constraint is subsequently applied;

if the at least one output string violates the constraint as a result of said applying P then responsive to the at least one output string violating the constraint, recursively repeating said applying P to each current input string that had been determined from applying P previously, until said applying P does not generate any more output strings violating the constraint, wherein a set of the generated output strings that do not violate the constraint represents the DAG; and displaying, on a display device, the set of the generated output strings that do not violate the constraint, wherein said recursively repeating said applying P is performed at least once.

16. The computer system of claim 15, wherein said applying P comprises:

identifying a substring of the input string violating the at least one constraint and not being the input string;

deriving from the substring all strings not violating the at least one constraint; and for each derived string, replacing the substring in the input string with each derived string to generate each output string.

17. The computer system of claim 16, wherein said deriving comprises deleting at least one character from the substring to generate each derived string.

18. The computer system of claim 15, wherein the at least one output string resulting from applying P to the character string that expresses the initial multi-chain violates the at least one constraint.

19. The computer system of claim 15, wherein the at least one output string resulting from applying P to the character string that expresses the initial multi-chain does not violate the at least one constraint.

20. The computer system of claim 15, wherein a first output string of the at least one output string generated from applying P to the input string expressing the initial multi-chain violates the at least one constraint to a lesser extent than does the input string expressing the initial multi-chain.

21. The computer system of claim 20, wherein the at least one output string generated from applying P to the input string expressing the initial multi-chain comprises a plurality of output strings, and wherein a second output string of the at least one output string generated from applying P to the input string expressing the initial multi-chain violates the at least one constraint to a lesser extent than does the input string expressing the initial multi-chain.

* * * * *

UNITED STATES PATENT AND TRADEMARK OFFICE
CERTIFICATE OF CORRECTION

PATENT NO. : 7,657,422 B2
APPLICATION NO. : 10/542456
DATED : February 2, 2010
INVENTOR(S) : Christian Mauceri It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this

Thirtieth Day of November, 2010

David J. Kappos
*Director of the United States Patent and Trademark Office*